Dec. 3, 1935.    A. A. HODGKINS    2,023,229
CONTROLS FOR REVERSE GEARING
Filed April 9, 1931    3 Sheets-Sheet 2

Inventor
Albert A. Hodgkins
By Rockwell & Bartholow
Attorney

Dec. 3, 1935.   A. A. HODGKINS   2,023,229
CONTROLS FOR REVERSE GEARING
Filed April 9, 1931   3 Sheets-Sheet 3
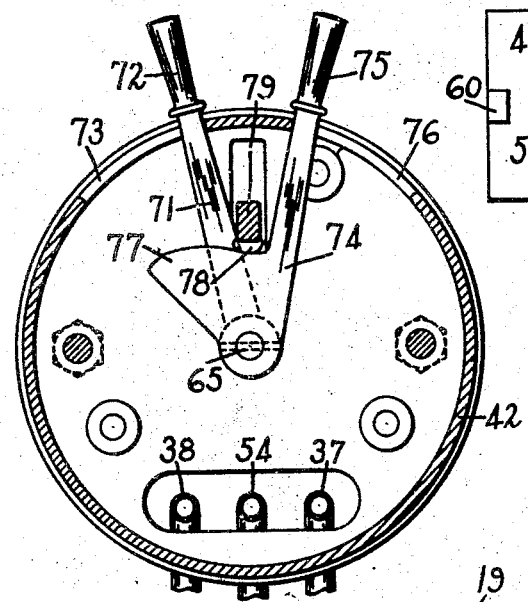
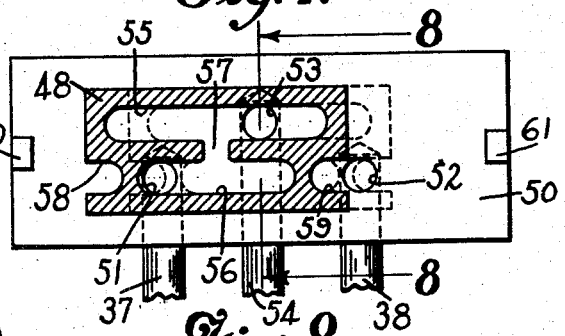
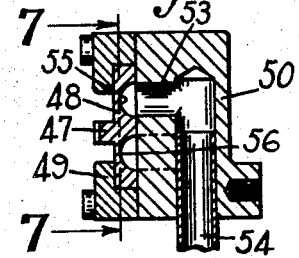
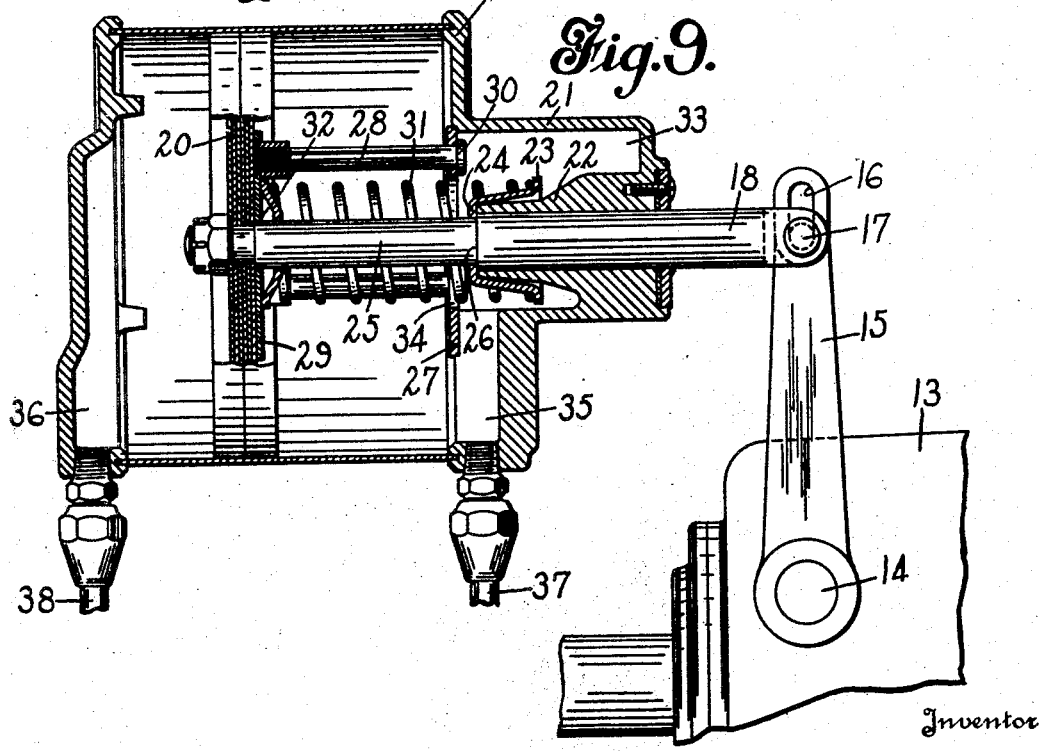
Inventor
Albert A. Hodgkins
By Rockwell & Bartholow
Attorneys Patented Dec. 3, 1935

2,023,229

UNITED STATES PATENT OFFICE 2,023,229

CONTROLS FOR REVERSE GEARING

Albert A. Hodgkins, Leonia, N. J., assignor to Universal Gear Shift Corporation, New Haven, Conn., a corporation of Delaware Application April 9, 1931, Serial No. 528,840

18 Claims. (Cl. 74—472)

This invention relates to control mechanism for reverse gearing and more particularly to reverse gearing of the type ordinarily used in connection with marine engines, such as motor boat engines and the like. It is usual to provide in the drive mechanism between the engine and propeller of a motor boat what is commonly known as a reverse gear so constructed that the operator of the boat by means of a control lever may set the gear for forward drive, for neutral in which position the engine idles without actuating the propeller, or for reverse drive as is desired.

In many instances and particularly in the cabin type of boats, the engine is often placed beneath the floor of the bridge deck and a system of levers and links connects the reverse gear mechanism with a control stand or box on the bridge deck so that the gear may be controlled from this point. When control of the gear is effected from a remote point in this way, the result is that the connections will naturally offer some resistance to the movement of the control lever due to their weight and to friction between the moving parts, and the shifting of the control lever is attended with some difficulty. In addition the connections between the control lever and the reverse gear must be disposed in more or less of a direct line and cannot always be placed in positions where they will not interfere with the use of the boat.

One object of my invention is to provide a controlling device for reverse gearing which may be operated with great facility and which will require the exertion of very little energy on the part of the operator.

Another object of the invention is the provision of a control mechanism for reverse gears which may be operated by fluid pressure, and preferably will be pneumatically operated by means of reduced air pressure or partial vacuum obtained from the engine manifold of an internal combustion engine.

A still further object of the invention is the provision of a reverse gear control mechanism of this character so constructed that the controls therefor may be mounted in the ordinary control box used in connection with reverse gears which are manually controlled.

Another object of the invention is to provide a novel remote control actuating device for a gear mechanism such that the device will operate positively and efficiently and the mechanism of which may be mounted within a relatively small space and in such locations that no obstructions will be offered to the use of the space in the boat.

Among other features of the invention I also contemplate providing a connection between the reverse gear control mechanism and the throttle so that movement of the former within predetermined limits will tend to accelerate or retard the speed of the engine.

To these and other ends, the invention consists in the novel features and combinations of parts to be hereinafter described and claimed.

In the accompanying drawings:

Fig. 6 is a sectional view on line 6—6 of Fig. 4;

Fig. 7 is a sectional view of the control valve on line 7—7 of Fig. 8;

Fig. 8 is a transverse section of the control valve on line 8—8 of Fig. 7, and

Fig. 9 is a sectional view of the actuating cylinder and piston.

Figure 1:
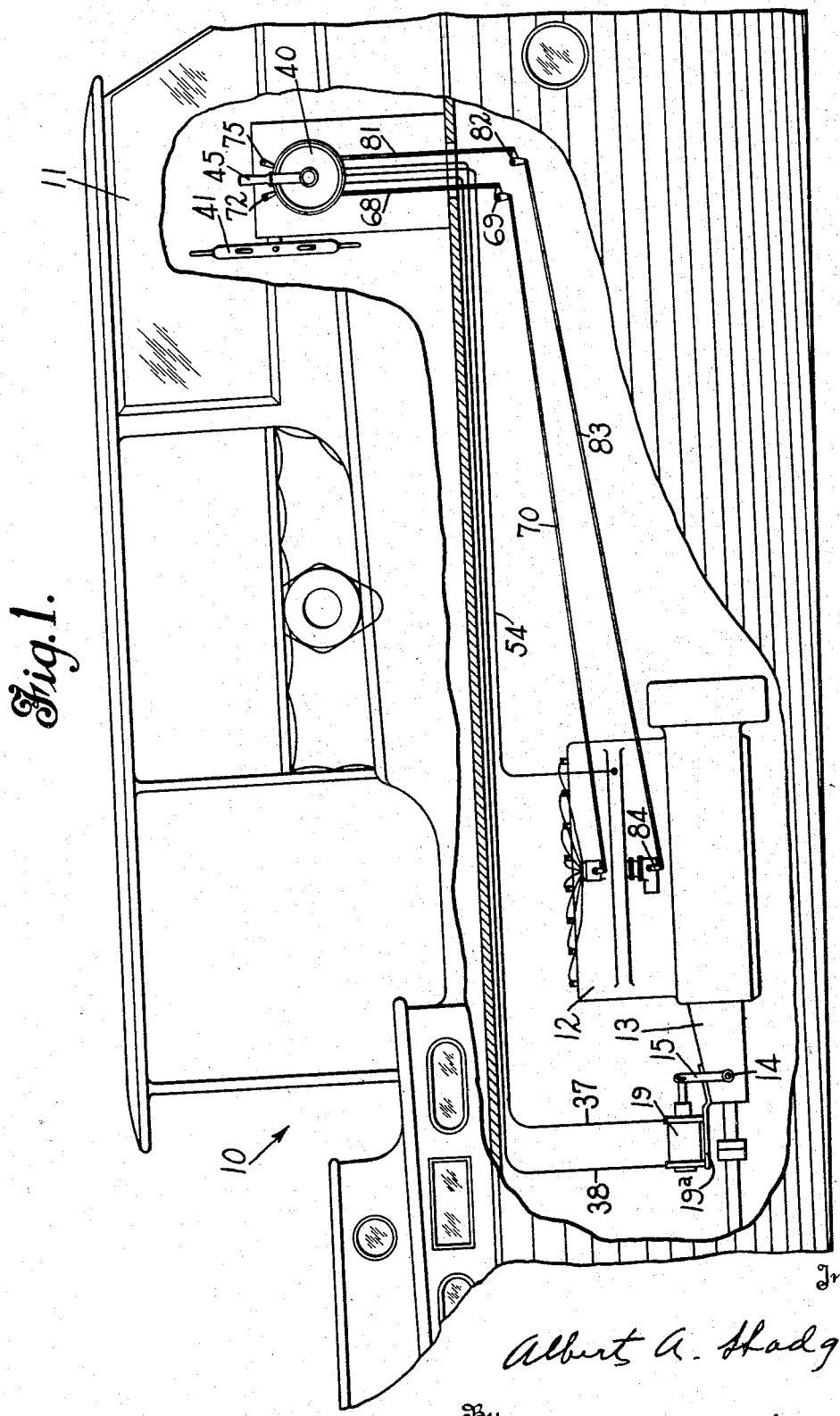
Fig. 1 is a side elevational view of my control mechanism mounted as shown applied to a motor boat.

To illustrate a preferred embodiment of my invention, I have shown in Fig. 1 of the drawings a portion of a motor boat 10 having a cabin 11 and a power source such as an internal combustion engine 12 provided with a housing 13 within which is located the usual reverse gear mechanism. Projecting from this housing is a rock shaft 14 upon which is secured a rock arm 15. It will be understood that, as is usual in the construction of such devices, the rock arm 15 will have a neutral position wherein the propeller will not be actuated by the engine and that when the arm is rocked in one direction from this position, such as for instance to the left as shown in Fig. 1, the propeller will be turned in such a direction as to drive the boat ahead, and when moved from the neutral position to the right, as shown in this figure, the direction of the propeller will be reversed. As shown, the neutral position will obtain when the rock arm 15 is in a substantially upright position, although this arrangement may be varied as desired.

The arm 15 is provided at its upper end with a slot 16 within which loosely rests a pin 17 carried by a piston rod 18, which rod projects from the cylinder 19 and has mounted thereon within the cylinder a piston 20, the relation being such, that as the piston is moved in one direction or the other in the cylinder from an intermediate position, the arm 15 will be rocked to the right or left, as shown in Figs. 1 and 9. The cylinder 19 may be supported upon the gear housing 13 by means of a bracket 19ª.

At one end of the cylinder is provided a hollow boss 21 within which is a thimble 22 surrounding the piston rod 18, the end of which thimble acts as a stop for a spring shoe 23. This spring shoe is provided with an inturned portion 24 at one end which surrounds a reduced portion 25 of the piston rod, so that when the piston moves in one direction, the shoe will be picked up and moved with it by the shoulder 26 provided at the end of the reduced portion 25.

Secured at one end of the cylinder is a supporting plate 27 through openings in which pass a number of bolts 28, the bolts having secured upon their ends a plate 29. The opposite ends of the bolts are provided with enlarged heads 30 which limit their movement in one direction through the plate 27. A spring 31 surrounds the piston rod within the cylinder and bears at one end against the spring shoe 23 and at the other end against the plate 29. The latter plate, while resting against the piston 20, is not secured thereto, and is also provided with a central opening 32 through which the reduced portion 25 of the piston rod moves freely. It will be understood, however, that the plate 29 will be moved to the right by the piston when the latter moves in this direction from the intermediate position shown in Fig. 9, and at this time the bolts 28 secured to the plate 29 will move to the right through the openings in the plate 27 into the hollow portion 33 of the boss 21. The spring 31 passes freely through an opening 34 in the plate 27 so that its end bears against the shoe 23.

The ends of the cylinder 19 are provided with fluid passages 35 and 36 which are connected respectively with tubes or pipes 37 and 38, by which fluid under pressure or vacuum may be introduced into the cylinder upon either side of the piston.

It will be understood that the spring 31 tends to maintain the piston in the position shown in Fig. 9, and will so maintain the piston except when the force of the spring is overcome by the force of fluid pressure within the cylinder. If, for instance, the pipe 37 is in communication with a source of vacuum or reduced air pressure, and the pipe 38 is vented to the atmosphere, the piston 20 will move to the right, as shown in Fig. 9, against the action of the spring and will compress the spring against the shoe 23, the bolts 28 moving into the chamber 33. If, now, the pipe 37 is vented to the atmosphere, the spring will return the piston to its original position. When the pipe 38 is in communication with a source of reduced air pressure and 37 vented to the atmosphere, the piston will be moved to the left from its intermediate position. During this movement the shoulder 26 on the piston rod picks up the shoe 23 and compresses the spring against the plate 29 which is held against movement to the left by the bolts 28, and the spring is thus compressed in the opposite direction so as to again return the piston 20 to its intermediate position when the pipe 38 is vented to the atmosphere.

The pipes 37 and 38 lead to a valve mechanism in a control box 40 which may be mounted on the bridge deck of the boat at a point remote from the engine adjacent the steering wheel 41 so as to be readily accessible to the operator of the boat.

The control box 40 comprises a casing 42 provided with a bearing 43 within which is rotatably mounted a shaft 44 which projects from the box and has secured to its projecting end a control handle or lever 45. A gear 46 is keyed to shaft 44 by the key 46ª, the teeth of which engage the teeth of a rack 47 upon a sliding valve 48, this valve being slidably secured by means of guide members 49 to a valve box 50 secured in the lower portion of the casing 42.

As shown in Figs. 7 and 8, the valve box 50 is provided with three ports 51, 52 and 53, the pipes 37 and 38 communicating respectively with the ports 51 and 52, while from the port 53 a pipe 54 extends to the intake manifold of the engine so as to be connected with a source of vacuum or reduced air pressure. The valve 48 is provided with passages 55 and 56, which are in communication with each other through the passage 57, the passage 55 registering with the port 53 and being of such a length that this passage and also, of course, the passage 56 will be in communication with the engine vacuum regardless of the position of the valve.

Opposite the passage 56 are provided recesses 58 and 59 opening through the ends of the valve. These recesses and the passage 56 register or are in line with the ports 51 and 52, so that when either of these recesses register with the respective ports, the latter are vented to the atmosphere, and when the passage 55 registers with either of the ports, such port will be in communication with the engine vacuum through the passage 55 and port 53. It will be observed that the passage 56 is of sufficient length so that a considerable movement of the valve is permitted while the port 51 or 52, as the case may be, remains in communication with the source of vacuum.

From the foregoing it will be understood that, when the control handle is in a neutral position, for instance in the upright position shown in the drawings, the valve 48 will be in the position shown in dotted lines in Fig. 7 wherein both ports 51 and 52 are vented to the atmosphere, and at this time both ends of the cylinder 19 will contain air under atmospheric pressure, the piston 20 remaining in an intermediate position as determined by the spring 31. When, however, the control lever 45 is moved in one direction or the other from this neutral position, the valve 48 will be correspondingly moved to cause the registration of the passage 56 with the port 51 and 52, and subject one end of the cylinder 19 to reduced air pressure. This condition will obtain, as shown in Fig. 7, immediately when one of the ports, say the port 51, comes into registration with the passage 55, and will, of course, continue although the valve 48 may be moved still further to the left, as shown in this figure, due to the length of the passage in the valve. The valve 48 may be moved to the left to its extreme position against the stop 60, while the port 51 remains in communication with the passage 55. A similar stop 61 is provided upon the other end of the valve block 50 to limit the movement of the valve in the opposite direction.

At the rear of the housing 42 a shaft 65 is rotatably mounted in a bearing 66, this shaft having secured to its outer end a crank arm 67 to which is connected a link 68 leading to one arm of a bell crank lever 69, the other arm of which is secured to a link or rod 70 connected to the distributor or ignition controlling device of the engine to advance or retard the spark in a well-known manner. Secured to the shaft 65 is a lever 71, the end 72 of which projects from the casing 42 through the slot 73 so that the lever may be manipulated to rotate the shaft 65 through a limited angle.

Loosely mounted on the shaft 65 is a second lever 74 the end 75 of which projects through a slot 76 in the casing for manual manipulation. Upon the lever 74 is provided a cam member 77 upon the cam surface of which rests a boss 78 formed upon a lever 79 pivoted at 80 within the casing 42. To the end of the lever 79 is secured a link 81 leading to one arm of a bell crank lever 82, the other arm of which is connected to a rod or link 83 leading to the throttle 84 of the engine to control the engine speed in a well-known manner.

It will be found advantageous to so connect the gear control and the engine speed control that both may be operated by the same lever simultaneously. To effect this result a cam member 85 is secured to the shaft 44 by means of the key 46ª. The cam 85 is provided with a cam surface comprising three distinct portions, an intermediate dwell portion 87, and outer actuating portions 88 and 89, the surfaces 87, 88 and 89 all being adapted to engage a second boss 90 provided on the lever 79.

Figure 4:
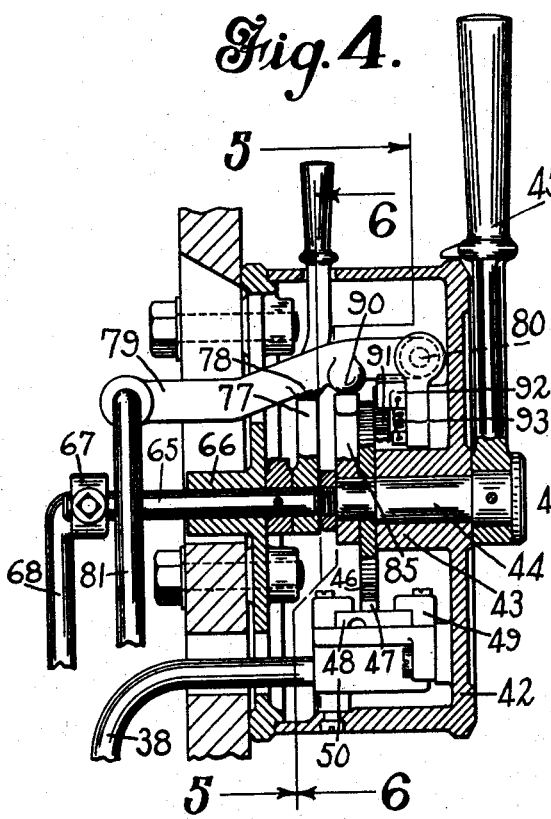
Fig. 4 is a sectional view on line 4—4 of Fig. 3.
Figure 5:
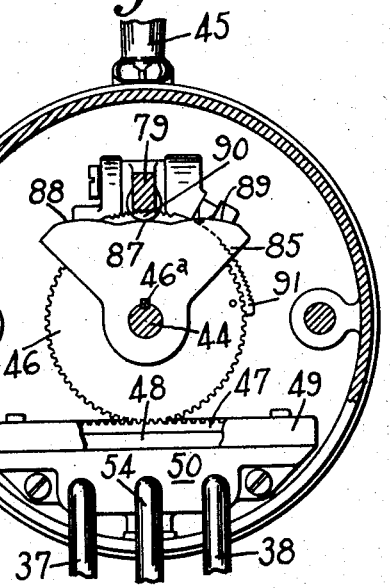
Fig. 5 is a sectional view on line 5—5 of Fig. 4.

The dwell portion 87 of the cam is so constructed that, as long as the boss 90 is engaged with this portion, no movement of the lever 79 will be effected, that is, this portion of the cam is substantially in the form of an arc about the shaft 44 as a center. When, however, the cam 85 is moved in either direction so that the portion 87 travels beyond the boss and the latter is engaged by either of the portions 88 or 89, the lever 79 will be moved upwardly, as shown in Fig. 4, and effect an acceleration of the engine. The foregoing description assumes that the throttle lever 74 has been set at zero or off position, for it will, of course, be understood that as the cams 77 and 85 act on the lever 79 independently of each other, the one which is in the higher position will naturally control the position of the lever 79. In other words when either of the cams 77 or 85 is moved to its zero position, the lever 79 will be controlled by the other cam if it is not also in its zero position, and if both are at zero position, the engine will merely be operated at its idling speed.

In order that the control lever 45 will be releasably held in a given position, a toothed quadrant 91 is secured to the gear 46 and a detent 92 is mounted in the housing and urged by its spring 93 in engagement with the teeth of this quadrant, so that the control lever will not be accidentally moved or jarred out of the position in which it is set.

Figure 2:
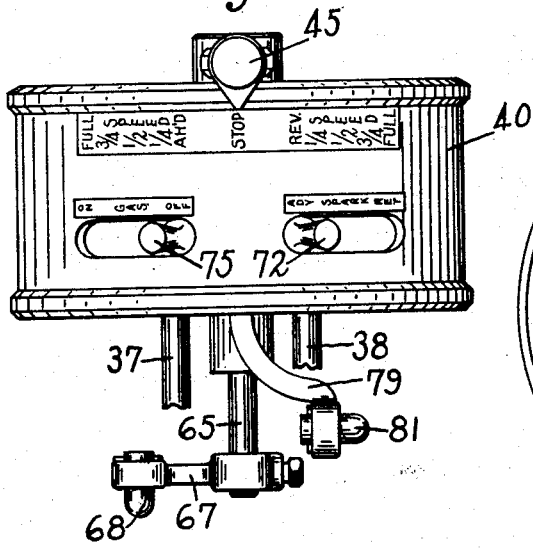
Fig. 2 is a top plan view of the control box.
Figure 3:
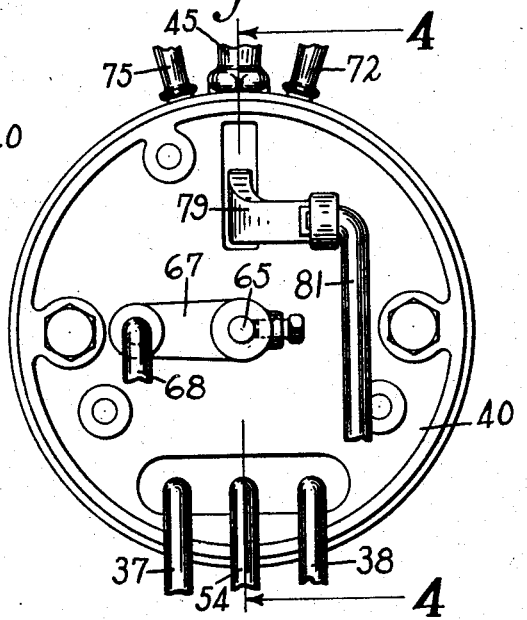
Fig. 3 is a rear elevational view of the control box.

While the operation of the device is clear from the foregoing description, it may briefly be described as follows. When the control levers 72, 75 and 45 are in the position shown in the drawings, it will be understood that the engine of the motor boat will be running at its idling speed and the reverse gear will be in its neutral position. If, for example, the operator wishes to move ahead, the lever 45 is moved to the left, as shown in Fig. 2, thus causing the passage 56 of the valve 48 to register with the port 52 and thus cause communication of one end of the cylinder 19 with the source of vacuum, which will result as has already been explained in the shifting of the gear to forward drive position. The movement of the lever 45, which will be sufficient to expose the port 52 to the passage 56 and to put the gear in forward, will take place while the dwell portion 87 of the cam engages the boss 90 so that no movement of the throttle lever 79 is effected. If, however, the operator wishes to increase the speed of the engine, he has only to move the lever 45 to a further extent which will result in the cam surface 89 engaging the boss 90 and raising the lever 79 to increase the engine speed. This will effect a further movement of the valve 48 to the right but will not affect the position of the gears as the port 52 will remain in communication with the elongated passage 56.

It will be understood that a like action takes place when the control handle 45 is moved in a direction to put the gear in reverse, at which time the handle may be moved a sufficient extent to cause the cam surface 88 to engage the boss 90 and increase the engine speed. In addition the throttle and the ignition may be controlled independently by means of the levers 72 and 75, and, if desired, the cam 85 may be dispensed with, so that the lever 45 controls the drive gear only.

It will be understood that I have arranged a convenient and effective mechanism for controlling the reverse gear of a motor boat or the like from a remote point, and that the only work necessary to be done by the operator is the shifting of the valve 48 by means of the control lever 45, as the remainder of the operation is effected by power operated means. This results in a considerable saving of expenditure of energy on the part of the operator, and as the engine vacuum is used as a source of power, the device is relatively simple and inexpensive.

It will also be obvious that the control box 40 may be placed at a convenient position on the boat as desired, and as the connection between the control box and the actuating cylinder consists merely of the fluid conduits or pipes 37 and 38, no difficulty will be experienced in establishing connection between the control box and the reverse gear mechanism regardless of the location of the former. Moreover the pipes 37 and 38 may be placed in convenient locations such as along partitions or the like where they will be in out of the way or concealed positions and will not interfere with the use of the available space in the boat.

While I have shown and described a preferred embodiment of my invention, it will be understood that it is not to be limited to all of the details shown, but is capable of modification and variation within the spirit of the invention and within the scope of the appended claims.

What I claim is:

1. In a controlling mechanism for marine power plants wherein a pneumatically operated reverse gear mechanism is employed between an internal combustion engine and a propelling means, and a standard control box having movable control members for the throttle and ignition of said engine and for controlling said pneumatically operated mechanism is located at a point remote from the engine, valve means mounted in said control box, conduits connecting said valve means with said pneumatically operated means and with the intake of said engine, said control member for the pneumatically operated means being operatively connected to said valve means to actuate the same, and means operated by said latter control member for actuating said throttle independently of said throttle control member, 2. In a controlling mechanism for marine power plants wherein a pneumatically operated reverse gear mechanism is employed between a source of power and a propelling means, means for controlling said pneumatically operated means, comprising a standard control box mounted at a point remote from the engine, levers mounted on said control box for controlling the throttle and ignition of the engine, a control arm on the control box, valve mechanism within the box actuated by said control arm, said valve mechanism being connected to the intake of the engine and to the pneumatically operated means, and means operated by said control arm for operating said throttle independently of said throttle controlling lever.

3. In a controlling mechanism for marine power plants wherein a pneumatically operated reverse gear mechanism is employed between a source of power and a propelling means, means for controlling said pneumatically operated means, comprising a standard control box mounted at a point remote from the engine, levers mounted on said control box for controlling the throttle and ignition of the engine, a control arm on the control box, valve mechanism within the box, said valve mechanism being connected to the intake of the engine and to the pneumatically operated means, said valve mechanism comprising a valve block and a valve mounted to slide longitudinally thereon, means to actuate said valve by said control arm comprising intermittently interengaging means and means operated by said control arm for operating said throttle independently of said throttle controlling lever.

4. In a controlling mechanism for marine power plants wherein a pneumatically operated reverse gear mechanism is employed between a source of power and a propelling means, means for controlling said pneumatically operated means, comprising a standard control box mounted at a point remote from the engine, levers mounted on said control box for controlling the throttle and ignition of the engine, a control arm on the control box, valve mechanism within the box actuated by said control arm, said valve mechanism being connected to the intake of the engine and to the pneumatically operated means, said valve mechanism comprising a valve and valve block arranged to permit limited movement of said valve without affecting said pneumatically operated means, and said control arm being connected to the throttle to actuate the same independently of said throttle controlling lever.

5. In a controlling mechanism for marine power plants wherein a pneumatically operated reverse gear mechanism is employed between an internal combustion engine and a propelling means, controlling means therefor comprising a standard control housing having movable control members for the throttle and ignition of said engine, a movable control arm mounted on said housing, a valve block mounted in the housing, conduits leading from said valve block to said pneumatically operated means and to a source of reduced air pressure, a valve mounted to slide longitudinally on said block, means for operating said throttle by rotation of said control arm independently of said throttle controlling member, and means to effect slidable movement of said valve by the rotation of said control arm comprising intermittently interengaging means, and said valve and valve block being arranged to permit limited movement of the valve without affecting said pneumatically-operated means.

6. In a controlling mechanism for marine power plants wherein a pneumatically operated reverse gear mechanism is employed between an internal combustion engine and a propelling means, controlling means therefor comprising a standard control housing having movable control members for the throttle and ignition of said engine, a movable control arm mounted on said housing, a valve block mounted in the housing, conduits leading from said valve block to said pneumatically operated means and to a source of reduced air pressure, a valve mounted to slide longitudinally on said block, means to effect slidable movement of said valve by the rotation of said control arm, said means comprising a rack on said valve and a toothed pinion moved by said control arm and engaging the teeth of the rack and means for controlling said throttle by rotation of said control arm, said latter means permitting limited rotation of said control arm without affecting said throttle.

7. In a controlling mechanism for marine power plants wherein a pneumatically operated reverse gear mechanism is employed between an internal combustion engine and a propelling means, controlling means therefor comprising a standard control housing having movable control members for the throttle and ignition of said engine, a movable control arm mounted on said housing, a valve block mounted in the housing, conduits leading from said valve block to said pneumatically operated means and to a source of reduced air pressure, a valve mounted to slide longitudinally on said block, means to effect slidable movement of said valve by the rotation of said control arm, said valve and valve block being arranged to permit limited movement of said valve without affecting said pneumatically operated reverse gear mechanism, and means associated with said control arm for operating said throttle by rotation of said arm, independently of said throttle control member.

8. In a controlling mechanism for marine power plants wherein a pneumatically operated reverse gear mechanism is employed between an internal combustion engine and a propelling means, a standard control housing having movable control members for the throttle and ignition of said engine, a control arm mounted on said housing, valve means mounted within the housing and operatively connected to the intake of the engine and to said pneumatically operated means, means for operating said valve means by said control arm, and connections between said control arm and said throttle control member whereby both said valve means and said throttle control member are actuated by said arm, said connections permitting limited rotation of said control arm without affecting said throttle.

9. In a controllng mechanism for marine power plants wherein a pneumatically-operated reverse gear mechanism is employed between an internal combustion engine and a propelling means, a housing, a valve structure mounted in said housing having conduits leading therefrom and adapted to lead to the pneumatically-operated means for the reverse gear mechanism and to the intake of the engine, a member pivoted in said housing and adapted to be connected to the throttle of the engine to control the same, a shaft rotatably mounted in the housing, and said shaft having means thereon to engage and actuate said valve and to engage and actuate said pivoted member.

10. In a controlling mechanism for marine power plants wherein a pneumatically-operated reverse gear mechanism is employed between an internal combustion engine and a propelling means, a housing, a valve structure mounted in said housing having conduits leading therefrom and adapted to lead to the pneumatically-operated means for the reverse gear mechanism and to the intake of the engine, a member pivoted in said housing and adapted to be connected to the throttle of the engine to control the same, a shaft rotatably mounted in the housing, said shaft having means thereon to engage and actuate said valve mechanism and to engage and actuate said pivoted member, said valve mechanism and said pivoted member being disposed in spaced relation, and said shaft being mounted between said valve and member.

11. In a controlling mechanism for marine power plants wherein a pneumatically-operated reverse gear mechanism is employed between an internal combustion engine and a propelling means, a housing, a valve structure mounted in said housing having conduits leading therefrom and adapted to lead to the pneumatically-operated means for the reverse gear mechanism and to the intake of the engine, a member pivoted in said housing and adapted to be connected to the throttle of the engine to control the same, a control arm rockably mounted in the housing, means operated by said control arm to engage and actuate said valve and to engage and actuate said pivoted member, and a second control arm pivoted in said housing and having means to engage and actuate said pivoted member independently of movement of the first-named control arm.

12. A controlling mechanism for marine power plants wherein a reverse gear mechanism is employed between an internal combustion engine and a propelling means, and pneumatically-operated means is employed to operate said reverse gear mechanism, said mechanism comprising a control housing, a valve mechanism in said housing and adapted to be connected to the intake of the engine and to the pneumatically-operated means to actuate the latter, a member pivoted in said housing and adapted to be connected to the engine throttle, a shaft rotatably mounted in the housing, manually-operable means to rotate said shaft, a member secured upon said shaft and engaged with said valve mechanism to actuate the same, means also mounted on said shaft and engaging said pivoted member to actuate the same, and said last-named means comprising a cam, shaped to permit limited movement of said shaft without actuating said pivoted member.

13. In a marine power plant wherein a reverse gear mechanism is employed between an internal combustion engine and a propelling means, pneumatically-operated means to operate said reverse gear mechanism, controlling mechanism for said power plant comprising a control housing, a valve mechanism in said housing and adapted to be connected to the intake of the engine and to the pneumatically-operated means to actuate the latter, a member pivoted in said housing and adapted to be connected to the engine throttle, a shaft rotatably mounted in the housing, manually-operable means to rotate said shaft, a member secured upon said shaft and engaged with said valve mechanism to actuate the same, means also mounted on said shaft and engaging said pivoted member to actuate the same, said last-named means comprising a cam shaped to permit limited movement of said shaft without actuating said pivoted member, and said valve mechanism being so arranged that limited movement thereof is permitted without affecting said pneumatically-operated means.

14. In a marine power plant wherein a reverse gear mechanism is employed between an internal combustion engine and a propelling means, pneumatically-operated means to operate said reverse gear mechanism, controlling mechanism for said power plant comprising a control housing, a valve mechanism in said housing and adapted to be connected to the intake of the engine and to the pneumatically-operated means to actuate the latter, a member pivoted in said housing and adapted to be connected to the engine throttle, a shaft rotatably mounted in the housing, manually-operable means to rotate said shaft, a member secured upon said shaft and engaged with said valve mechanism to actuate the same, means also mounted on said shaft and engaging said pivoted member to actuate the same, said last-named means comprising a cam shaped to permit limited movement of said shaft without actuating said pivoted member, and a control arm pivoted in the housing and having means to engage and actuate said pivoted member independently of said shaft.

15. In a marine power plant wherein a reverse gear mechanism is employed between an internal combustion engine and a propelling means, pneumatically-operated means to operate said reverse gear mechanism, controlling mechanism for said power plant comprising a control housing, a valve mechanism in said housing and adapted to be connected to the intake of the engine and to the pneumatically-operated means to actuate the latter, a member pivoted in said housing and adapted to be connected to the engine throttle, a shaft rotatably mounted in the housing, manually-operable means to rotate said shaft, a member secured upon said shaft and engaged with said valve mechanism to actuate the same, means also mounted on said shaft and engaging said pivoted member to actuate the same, said last-named means comprising a cam shaped to permit limited movement of said shaft without actuating said pivoted member, a control arm pivoted in the housing and having means to engage and actuate said pivoted member, and said control arm and said means on the shaft engaging said pivoted member being so arranged that said pivoted member may be operated by either without movement of the other.

16. In combination with an internal combustion engine and a reverse gear mechanism associated therewith, pneumatically-operated means for actuating said reverse gear mechanism, a housing, a member movably mounted in said housing and connected with the engine throttle to actuate the same, a valve in said housing connected to said pneumatically-operated means, a control element associated with the housing to actuate said valve, an independently movable control element also associated with said housing to actuate said movably-mounted member, and means whereby movement of said first-named control element also actuates said movably mounted member.

17. In combination with an internal combustion engine and a reverse gear mechanism associated therewith, pneumatically-operated means for actuating said reverse gear mechanism, a housing, a member pivoted in said housing and connected to the engine throttle to actuate the same, a valve in said housing connected to said pneumatically-operated means and to the intake of the engine, a control element associated with the housing and connected to said valve to actuate the same, a member moved by said control element and having a cam surface acting on said pivoted member to move the latter, and a lever fastened within said housing for controlling said pivoted member independently of said control element.

18. In combination with an internal combustion engine and a reverse gear mechanism associated therewith, pneumatically-operated means for actuating said reverse gear mechanism, a housing, a member pivoted in said housing and connected to the engine throttle to actuate the same, a valve in said housing connected to said pneumatically-operated means and to the intake of the engine, a control element associated with the housing and connected to said valve to actuate the same, a member moved by said control element and having a cam surface acting on said pivoted member to move the latter, and a second control element associated with the housing and having a cam thereon engaging said pivoted member to actuate the latter independently of said first-named control.

ALBERT A. HODGKINS.